United States Patent [19]

Kayakabe et al.

[11] Patent Number: 4,648,163
[45] Date of Patent: Mar. 10, 1987

[54] METHOD OF MAKING A POLY-V RIBBED PULLEY

[75] Inventors: Nobuhiro Kayakabe, Toyota; Tadashi Sugiura, Nishikamo; Hitoshi Sugimoto, Nagoya, all of Japan

[73] Assignee: Aisin Seiki Kabushiki Kaisha, Kariya, Japan

[21] Appl. No.: 766,696

[22] Filed: Aug. 19, 1985

[30] Foreign Application Priority Data

Aug. 24, 1984 [JP] Japan .................................. 59-177289
Aug. 27, 1984 [JP] Japan .................................. 59-179130

[51] Int. Cl.$^4$ ............................................. B21D 53/26
[52] U.S. Cl. .................................... 29/159 R; 474/168
[58] Field of Search ............. 29/159 R; 474/168, 169, 474/170

[56] References Cited

U.S. PATENT DOCUMENTS 2,827,225  3/1958  Killian ................................ 29/159 R

FOREIGN PATENT DOCUMENTS 38630   3/1983  Japan .................................. 29/159 R
41640   3/1983  Japan .................................. 29/159 R
134268  8/1983  Japan .................................... 474/169
110440  6/1984  Japan ....................................... 72/68

Primary Examiner—Howard N. Goldberg
Assistant Examiner—P. W. Echols
Attorney, Agent, or Firm—Oblon, Fisher, Spivak, McClelland & Maier

[57] ABSTRACT

A method of making a poly-V ribbed pulley engaged with a V-ribbed belt or V-ribbed belts. The method includes the steps of pressing two flanges or one circular projection between the two flanges in the cylinder, pressing a flange at the radially outer end of a thick circular plate, connecting one flange of the cylinder to the flange of the thick circular plate by welding, and performing rolling to form V-shaped grooves at the outside surface of the cylinder.

12 Claims, 13 Drawing Figures

METHOD OF MAKING A POLY-V RIBBED PULLEY

BACKGROUND OF THE INVENTION

1. Field of the Invention

The present invention relates to a method of making a poly-V ribbed pulley and, more particularly to a method making a poly-V ribbed pulley for use with poly-V belts.

2. Discussion of the Background

Poly-V ribbed pullies are widely used in the driving system of automobile engines or electric motors. An example of this type method of making a poly-V ribbed pulley is disclosed in Japanese Patent Publication No. 58(1983)-54898. The method of making a poly-V ribbed pulley described therein comprises a press working process and a roll working process. The press working process is employed to form a cylinder having a bottom and two circular projections. Namely the cylinder having both the bottom and a flange at each end is made of a thick circular plate by press working wherein the thickness of the bottom becomes thinner than that of the flange. Afterwards the flange is bent parallel with the axis of the cylinder so as to extend it, and two circular projections are formed at each side of the extended cylinder member. The rolling process is employed to form V-shaped grooves at the outside surface of the extended cylinder member by roll working.

SUMMARY OF THE INVENTION

It is an object of the present invention to provide a method of making a poly-V ribbed pulley which saves several steps in the press working process and reduces the manufacturing cost.

It is another object of the present invention to provide a method of making a poly-V ribbed pulley which makes the bottom uniform, planar and perpendicular to the axis of the cylinder when the thickness of the bottom becomes thinner than that of the cylinder.

It is a further object of the present invention to provide a method of making a poly-V ribbed pulley wherein V-shaped grooves are formed with high accuracy.

It is a still further object of the invention to provide a method of making a poly-V ribbed pulley which prolongs the life of V-shaped grooves formed by the rolling roller.

According to the present invention, a method of making a poly-V ribbed pulley comprises the steps of pressing two flanges at each end of a cylinder, pressing a flange at an end of a thick circular plate, connecting one flange of the cylinder to the flange of the thick circular plate by welding, and performing rolling so as to form V-shaped grooves at the outside surface of the cylinder.

An alternate method of making a poly-V ribbed pulley comprises the steps of pressing two flanges at each end of a cylinder and a circular projection in the middle of each end of the cylinder, pressing a flange at the end of a thick circular plate, connecting one flange of the cylinder to the flange of the thick circular plate by welding, and performing rolling so as to form V-shaped grooves at the outside surface of the cylinder.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

FIGS. 1A–1F illustrate one embodiment of a method of making a poly-V ribbed pulley in accordance with the present invention.

Figure 1A:
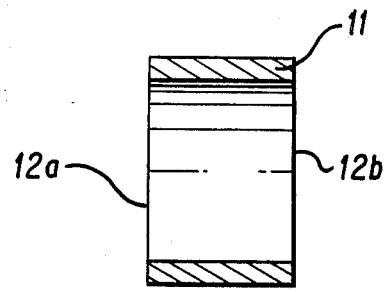
FIGS. 1A–1F constitute a flow diagram of a process of producing a poly-V ribbed pulley in accordance with a first embodiment of the present invention.
Figure 1B:
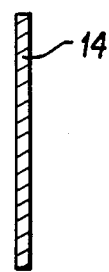
Figure 1C:
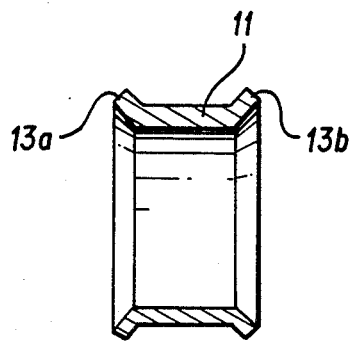

Referring now to FIGS. 1A and 1C, a cylinder 11 is made of a structural steel pipe and is greater than 3.0 mm in thickness for mechanical strength. Flanges 13a and 13b are formed at each end 12a and 12b of the cylinder 11 by press working.

Figure 1D:
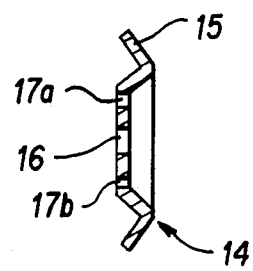

In FIGS. 1B and 1D, a circular plate 14 is shown which is made of structural steel sheet and which is 2.0–2.6 mm in thickness for design and light weight characteristics. The thickness of the circular plate 14 is thinner than that of the cylinder 11. A flange 15 is formed at a radially outer end of the circular plate 14 with plate 14 having an axle hole 16 and gripping holes 17a and 17b formed therein by press working.

Figure 1E:
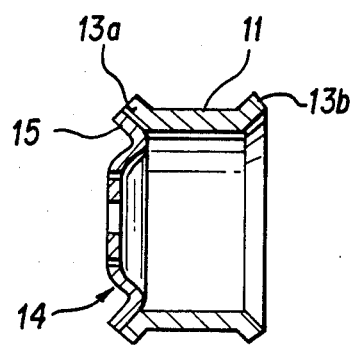
Figure 1F:
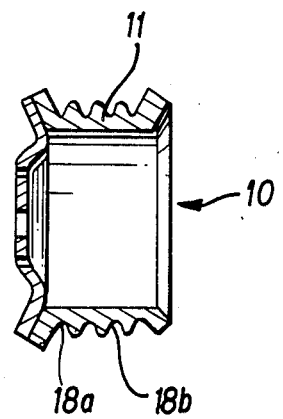

As shown in FIG. 1E, flange 13a of the cylinder 11 is connected to the flange 15 of the circular plate 14 by TIG welding (i.e., tungsten inert gas welding). In FIG. 1F, V-shaped grooves 18a and 18b are shown which are formed at the outside surface of the cylinder 11 by roll working. Therefore a poly-V ribbed pulley 10 may be obtained in accordance with the first embodiment of the present invention. The present invention will be more clearly understood with reference to the following example which is illustrative of the poly-V ribbed pulley 10 and wherein the thickness of the cylinder wall having V-shaped grooves 18a and 18b is 4.2 mm and the depth of V-shaped grooves 18a and 18b is 3.1 mm. The V-ribbed pulley 10 is superior in dimensional accuracy and demonstrates mechanical strength under heavy applied loads.

The thickness of the circular plate 14 is uniform and such plate is planar, the welding strength of flanges 13a and 15 is high and the circular plate 14 is perpendicular to the axis of the poly-V ribbed pulley 10.

Figure 2A:
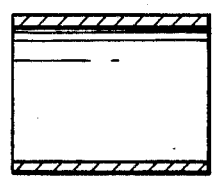
FIGS. 2A–2G constitute a flow diagram of a process of producing a poly-V ribbed pulley in accordance with a second embodiment of the present invention.
Figure 2B:
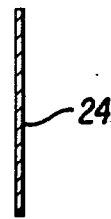

FIGS. 2A–2G illustrate a second embodiment of the present invention. This embodiment is similar to the first embodiment except for the provision for a circular projection 29, which is formed in the middle of each end of the cylinder 21. As shown in FIGS. 2A and 2B, the cylinder 21 is made of structural steel pipe and is greater than 3.0 mm in thickness for mechanical strength. A circular plate 24 is shown which is made of structural steel sheet and is 2.0–2.6 mm in thickness for design and light weight characteristics.

Figure 2C:
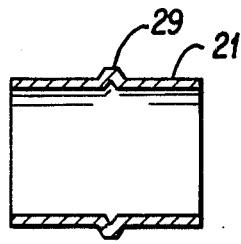
Figure 2E:
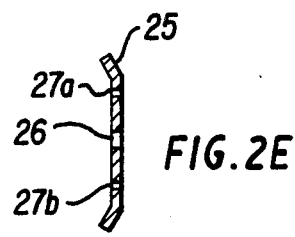
Figure 2D:
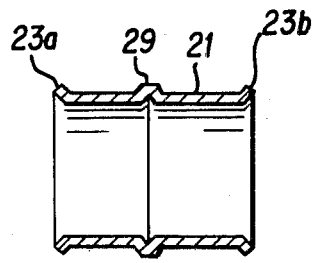
Figure 2F:
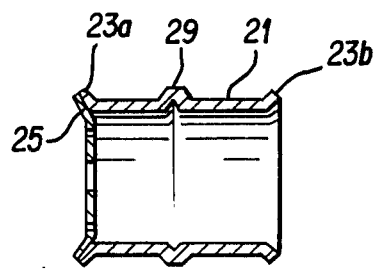
Figure 2G:
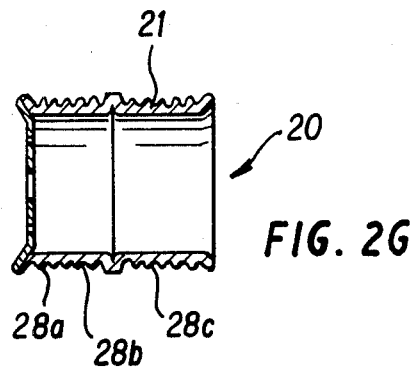

First, as shown in FIG. 2C, the circular projection 29 is formed by employing an outer die, an inner die and a expander, or by employing an outer die, an inner die, a plate and a cylinder punch. Afterwards as shown in FIG. 2D, the two flanges 23a and 23b of the cylinder 21 are formed by press working, and as shown in FIG. 2E, a flange 25, an axial hole 26 and gripping holes 27a and 27b are formed in circular plate 24 by press working. In FIG. 2F is shown the flange 23a of the cylinder 21 which is connected to the flange 25 of the circular plate 24 by TIG welding. In FIG. 2G, V-shaped grooves 28a, 28b and 28c are shown which are formed at the outside surface of the cylinder 21 by roll working. Therefore a poly-V ribbed pulley 20 may be obtained in accordance with the present invention. An example of this embodiment is similar to that of the first and is such that the thickness of the cylinder wall having V-shaped grooves 18a, 18b and 18c is 4.2 mm and the depth of the V-shaped grooves 28a, 28b and 28c is 3.1 mm.

The poly-V ribbed pulley 20 is superior in dimensional accuracy and mechanical strength under heavy loads. The thickness of the circular plate 15 is uniform and planar, the welding strength of flanges 23a and 25 is comparatively high and the circular plate 24 is perpendicular to the axis of the poly-V ribbed pulley 20.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of making a poly-V ribbed pulley, which comprises the steps of:
    pressing a cylinder so as to form a first and second flange at each end, respectively, of said cylinder;
    pressing a circular plate so as to form a flange;
    connecting said first flange of said cylinder to said flange of said circular plate by welding; and
    rolling said cylinder so as to form a plurality of V-shaped grooves at an outside surface of said cylinder.

2. The method as claimed in claim 1 wherein said welding further comprises tungsten inert gas welding.

3. The method as claimed in claim 1, wherein said cylinder further comprises structural steel pipe and said circular plate further comprises a structural sheet.

4. The method as claimed in claim 3, wherein the thickness of said metal pipe is set to be greater than 3.0 mm and the thickness of said thick circular material is set to be 2.0–2.6 mm.

5. The method as claimed in claim 1, wherein said circular plate is of uniform thickness and is planar.

6. The method as claimed in claim 5, wherein said circular plate is perpendicular to an axis of said poly-V ribbed pulley.

7. A method of making a poly-V ribbed pulley, which comprises the steps of:
    pressing a cylinder so as to form a first and second flange at each end, respectively, of the cylinder and a circular projection in a middle portion of said cylinder;
    pressing a circular plate so as to form a flange;
    connecting said first flange of said cylinder to said flange of said circular plate by welding; and
    rolling said cylinder so as to form a plurality of V-shaped grooves at an outside surface of said cylinder.

8. The method as claimed in claim 7, wherein said welding further comprises tungsten inert gas welding.

9. The method as claimed in claim 7, wherein said cylinder further comprises structural steel pipe and said circular plate further comprises structural sheet.

10. The method as claimed in claim 9, wherein the thickness of said metal pipe is set to be greater than 3.0 mm and the thickness of said thick circular material is set to be 2.0–2.6 mm.

11. The method as claimed in claim 7, wherein said circular plate is uniform in thickness and is planar.

12. The method as claimed in claim 11, wherein said circular plate is positioned perpendicular to an axis of said poly-V ribbed pulley.

* * * * *